United States Patent
Becker et al.

(10) Patent No.: US 8,140,885 B2
(45) Date of Patent: Mar. 20, 2012

(54) ACCOUNTING FOR MICROPROCESSOR RESOURCE CONSUMPTION

(75) Inventors: Daniel Becker, Meckenheim (DE); Rafael Keggenhoff, Tuebingen (DE); Thuyen Le, Taufkirchen (DE); Tobias Webel, Schwaebisch-Gmuend (DE); Matthias Woehrle, Beitigheim-Bissingen (DE)

(73) Assignee: International Business Machines Corporation, Armonk, NY (US)

( * ) Notice: Subject to any disclaimer, the term of this patent is extended or adjusted under 35 U.S.C. 154(b) by 627 days.

(21) Appl. No.: 12/029,636

(22) Filed: Feb. 12, 2008

(65) Prior Publication Data
US 2008/0209245 A1 Aug. 28, 2008

(30) Foreign Application Priority Data
Feb. 14, 2007 (EP) .................................. 07102339

(51) Int. Cl.
*G06F 1/08* (2006.01)
(52) U.S. Cl. ........ 713/503; 713/322; 713/502; 713/600; 327/156
(58) Field of Classification Search .......... 713/501–503, 713/600, 322; 327/156
See application file for complete search history.

(56) References Cited

U.S. PATENT DOCUMENTS

| | | | |
|---|---|---|---|
| 5,974,557 A | 10/1999 | Thomas et al. | |
| 6,304,978 B1 | 10/2001 | Horigan et al. | |
| 6,985,581 B1 * | 1/2006 | Callum | 380/2 |
| 7,774,635 B2 * | 8/2010 | Shiota | 713/500 |
| 2004/0216113 A1 | 10/2004 | Armstrong et al. | |
| 2005/0060163 A1 | 3/2005 | Barsness et al. | |

FOREIGN PATENT DOCUMENTS
WO WO2004088518 10/2004

OTHER PUBLICATIONS

P. Mackerras et al "Operating System Exploitation of the POWER5 System", IBM Journal of Research and Development, vol. 49, No. 4/5, 2005, pp. 533-539.
"Advanced POWER Virtualization on IBM eServer p5 Servers: Architecture and Performance Considerations", IBM Redbook, SG24-5868-01, Nov. 2005, especially pp. 31-35.
"PowerISA Version 2.03", Sep. 29, 2006, published by POWER.org.
Waldron "Low-Overhead Processor Idle Detection in a Multitasking Operating System", IBM Technical Disclosure Bulletin, vol. 37, No. 10, Oct. 1994, pp. 111-112.
Adams et al "Simulation of Multiple Timers Using One Actual Timer", IBM Technical Disclosure Bulletin, vol. 38, No. 3, Mar. 1995, pp. 301-304.

(Continued)

*Primary Examiner* — Thuan N Du
(74) *Attorney, Agent, or Firm* — Steven Chiu (57) ABSTRACT

Techniques for accounting microprocessor resource consumption. The present invention provides an automatic method to timely determine the current microprocessor clock frequency. Information provided by timer facilities of the microprocessor is reused by sampling this information at constant intervals. Such direct derivation of the microprocessor clock frequency is a real-time method that also takes into consideration secondary effects. Examples for such secondary effects include clock frequency variations across chips due to manufacturing variations, any degradation due to performance loss by thermal, or other detrimental effects as well as any voltage changes. In the preferred embodiment of the invention, the real-time microprocessor clock frequency determination is implemented as part of the microprocessor itself. No additional service processors or other external hardware facilities are needed in order to control the microprocessor clock frequency determination function.

16 Claims, 5 Drawing Sheets

OTHER PUBLICATIONS

USPTO U.S. Appl. No. 11/539,225 to Larry Brenner, filed Oct. 6, 2006, Office Action dated Feb. 10, 2009, IBM.
USPTO U.S. Appl. No. 11/539,225 to Larry Brenner, filed Oct. 6, 2006, Office Action dated Oct. 7, 2009, IBM.
USPTO U.S. Appl. No. 11/539,225 to Larry Brenner, filed Oct. 6, 2006, Office Action dated Feb. 23, 2010, IBM.
USPTO U.S. Appl. No. 11/539,225 to Larry Brenner, application filed Oct. 6, 2006, Abandoned Jun. 24, 2010.

* cited by examiner

ACCOUNTING FOR MICROPROCESSOR RESOURCE CONSUMPTION

BACKGROUND OF THE INVENTION

The present invention relates to the accounting of resources in a microprocessor, particularly to a microprocessor supporting simultaneous multi-threading (SMT) which is used as Central Processor Unit (CPU) in a computer system.

SMT is the ability of a single physical microprocessor to concurrently dispatch instructions from more than one hardware thread. For example, two hardware threads can run on one physical processor at the same time. SMT is a good choice when overall throughput is more important than the throughput on an individual thread of execution. For example, web servers and database servers are good candidates for being executed on servers with CPUs supporting SMT.

The operating systems available on some server-class computing hardware such as IBM's System P and System I offer exact CPU accounting based on the ticks of a timebase register. This feature allows charging accurately for the CPU time used, a feature widely used by data centers and computing utilities. A special scenario is the case when performance throttling is used in order to decrease the maximum microprocessor frequency below the nominal microprocessor frequency. This allows selling or leasing computer systems in different price ranges without any changes to the actual computer system hardware itself.

With the introduction of SMT to CPU architectures, simple use of the timekeeping hardware is no longer sufficient because the SMT mechanism allocates processing resources to competing hardware threads on a very fine-grained basis, for example, at each instruction dispatch clock cycle in the CPU.

The IBM POWER5 processor architecture introduced a special-purpose register (SPR) per hardware thread for tracking the CPU time allocated to each hardware thread. The exploitation of this SPR by operating systems is described in P. Mackerras et al. "Operating system exploitation of the POWER5 system", IBM J. RES. & DEV., Vol. 49, No. 4/5, 2005, pp. 533-539. This SPR is called PURR, the Processor Utilization of Resources Register. There is one PURR for each hardware thread that contains data specific to that particular thread. The PURR is defined to be 64 bits long. It is writeable in privileged state with the so-called hypervisor bit on (HV=1), readable in privileged state and inaccessible in problem state. This definition allows a hypervisor to virtualize the PURR for the operating systems by saving and restoring it on context switch. For example, this is done by the IBM standard hypervisor for POWER5 PHYP (IBM POWER Hypervisor). Regular operating systems such as IBM AIX and Linux can only read the PURR.

The hardware increments for PURRs are based on how each thread is using the resources of the processor, including the dispatch clock cycles that are allocated to each thread. For a clock cycle in which no instructions are dispatched, the PURR of the thread that last dispatched an instruction is incremented. The register advances automatically so that the operating system can always get the current up-to-date value.

Many new generation computing systems require active power and thermal management in order to function correctly, maintain their stability, reduce operating costs and extract maximum performance. Power consumption and the associated heat generation of modern microprocessors are key design issues in the development process of computer systems, as microprocessors are major consumers of power and sources of heat in computer systems. Many mechanisms exist in contemporary microprocessors to vary its power consumption, which try to counteract thermal stress and over temperature due to increased power consumption and heat dissipation. Often these techniques alter processing operating characteristics of the microprocessors in the computer system to control power and temperature.

Many such methods are often explicitly decreasing or increasing microprocessor clock frequency and voltage, hence the name dynamic frequency and voltage scaling (DVFS) methods (also known as slewing). Other known methods are pipeline throttling and IPC (Instruction Per Cycle) throttling (also known as IPC clipping or limiting). Pipeline throttling divides the available clock cycles into windows with a fixed number of hold or dead clock cycles. A microprocessor core can throttle by limiting the

SUMMARY OF THE INVENTION

The present invention provides techniques for accounting microprocessor resource consumption.

The present invention provides an automatic method to timely determine the current microprocessor clock frequency. Information provided by timer facilities of the microprocessor is reused by sampling this information at constant intervals. Such direct derivation of the microprocessor clock frequency is a real-time method that also takes secondary effects into account. Examples for such secondary effects include clock frequency variations across chips due to manufacturing variations as well as any degradation due to performance loss by thermal or other detrimental effects as well as any voltage changes.

The method includes determining the current microprocessor clock frequency by performing the following steps. The method includes determining and storing an initial microprocessor clock cycle count for a period when the current clock frequency of said microprocessor is the nominal clock frequency of said microprocessor; periodically sampling microprocessor clock cycle counts for said microprocessor; calculating a frequency ratio between an actual clock frequency and the nominal clock frequency of said microprocessor based on a ratio of a sampled microprocessor clock cycle count and said initial microprocessor clock cycle count; and providing said frequency ratio for determining said actual clock frequency.

In a preferred embodiment of the invention, a real-time microprocessor clock frequency determination method is implemented as part of the microprocessor itself and the periodical sampling is controlled by a constant timer reference signal. Additional service processors or other external hardware facilities may not be required in order to control the DVFS and the microprocessor clock frequency determination. Such automatic real-time microprocessor clock frequency derivation also reduces the latency for the determination of clock frequency changes, hence allowing greater accuracy of the resource accounting.

BRIEF DESCRIPTION OF THE DRAWINGS

The present invention and its advantages are now described in conjunction with the accompanying drawings.

DETAILED DESCRIPTION

Scaled Processor Utilization of Resources Registers

A microprocessor chip can comprise multiple processor cores. All of the power and thermal actions on a microprocessor are assumed to be per core and affect all of the hardware threads on the processor core in the same manner. Such actions can be partially or completely performed by the microprocessor itself or by additional external hardware and/or software components.

Since the values retrieved from the PURR do not depend on the current power and thermal management state of the microprocessor, the PURR is no longer adequate for accurate accounting and charging. To allow software executed on the microprocessor to determine the rate at which resources are being consumed relative to the current scaling of the microprocessor clock frequency, an additional set of SPRs, one register per each SMT hardware thread, is added to the microprocessor. Each of the new registers is called a Scaled Processor Utilization of Resources Register (SPURR).

For the purpose of illustration, the computer system timekeeping function is described in terms of the IBM POWER5 architecture. However, other processor architectures may have similar features for keeping time. Details for the POWER5 architecture can be found, for example, in "Advanced POWER Virtualization on IBM eServer p5 Servers: Architecture and Performance Considerations", IBM Redbook, SG24-5768-01, November 2005, especially pp. 31-35. In the case of the POWER5, the timebase register keeps time in terms of ticks, which include a multiple of the nominal microprocessor clock frequency. Even when using DVFS, the timebase will continue to tick at a constant rate to allow the computer system to track wall-clock time correctly. Thus, regardless of whether DVFS is used or not, the timebase increments at the same rate, and each timebase tick represents the same amount of wall-clock time.

A SPURR is a 64 bit register. To allow hypervisors such as PHYP to virtualize it by saving and restoring it on partition switch, it is writeable in privileged microprocessor state with hypervisor bit on (HV=1), readable in privileged state and inaccessible in problem state. The microprocessor maintains the SPURR SPRs, regardless of the state of the processor compatibility controls, which, in the case of the POWER5, are contents of the PCRs (Platform Control Registers). The hypervisor has the option of using the accumulated SPURR values to present the work accomplished on a physical microprocessor. In addition, to allow for migration-aware operating systems and to offer the maximum flexibility, the SPURR remains readable to operating systems running in privileged state in compatibility mode. Older operating system implementations may support using the SPURR.

The content of the SPURR($HWT_i$) for a SMT hardware thread $HWT_i$ is defined as follows where, tb is the value of the timebase register in ticks, disp($HWT_i$) is the number of instructions dispatched per timebase tick, $f_{eff}$ is the current clock frequency of the microprocessor cores, $f_{nom}$ is the nominal clock frequency of the microprocessor cores, $fact_{thrott}$ and $fact_{IPC}$ are factors related to pipeline throttling and IPC throttling:

$$SPURR(HWT_i) = \left( \frac{disp(HWT_i)}{\sum_{j=0}^{tb} disp(HWT_j)} \right) \cdot \frac{f_{eff}}{f_{nom}} \cdot tb \cdot (1 - fact_{throttling}) \cdot (1 - fact_{IPC}).$$

The throttling factor $fact_{throttling}$ is the result of the run-and-hold throttling mechanism used by pipeline throttling. If there are run_cycles of run and hold_cycles of hold in the window, then $$fact_{thrott} = \frac{hold\_cycles}{run\_cycles + hold\_cycles}.$$

The IPC-limiting factor $fact_{IPC}$ is due to the clipping of the maximum IPC of the thread $HWT_i$ to the limit assigned to the microprocessor core by the IPC throttling. Let dead_cycles be the number of clock cycles that the IPC-limiting mechanism kills, and let live_cycles be the number of surviving clock cycles. Then the IPC-limiting factor $fact_{IPC}$ is defined as follows:

$$fact_{IPC} = \frac{dead\_cycles}{dead\_cycles + live\_cycles}.$$

The typical implementation increments the cycle count that accumulates to track the ticks of the thread $HWT_i$ faster or slower depending on the state of the microprocessor core. The SPURR($HWT_i$) assigns unusable clock cycles in which no thread can dispatch instructions in the same manner as the PURR of the POWER5.

There is a consistency criterion that applies to the SPURR. If $f_{eff}=f_{nom}$ and there is no throttling of either form, then PURR(HWT)=SPURR(HWT) for all SMT hardware threads HWT. The SPURR is monotonically non-decreasing, but the other PURR invariants need not hold.

In the implementation of the POWER5, the SPURR has an SPR number assigned to it. It is 308, one less than the 309 number for the PURR. The entry for the SPURR in the mtspr mnemonics added to the table on page 402 of "PowerISA Version 2.03", Sep. 29, 2006, published by POWER.org, is as follows:

| Decimal | spr[5:9] | spr[0:4] | Register Name | Privi-Ledged |
|---------|----------|----------|---------------|--------------|
| 308     | 01001    | 10100    | SPURR         | Hypv         |

The entry for the SPURR in the mfspr mnemonics added to the table on page 402 of "PowerISA Version 2.03", Sep. 29, 2006, published by POWER.org, is as follows:

| Decimal | Spr[5:9] | spr[0:4] | Register Name | Privi-ledged |
|---------|----------|----------|---------------|--------------|
| 308     | 01001    | 10100    | SPURR         | yes          |

The definition of processor utilization, which is the only type that PHYP and the operating systems have in view, continues to be based on the PURR and does not change. In the following, it is assumed that SWT denotes the software thread of execution and HWT denotes the SMT hardware thread it gets when it runs. Then the utilization util(SWT) in a dispatch interval is defined as follows, where $PURR_{START}$(HWT) is the content of the PURR for HTW at the start of the interval, $PURR_{END}$(HWT) is the content of the PURR for HWT at the end of the interval, ticks is the total number of timebase ticks in the interval, and ticks_not_in_idle is the number of timebase ticks where the thread is not idle in the interval:

$$util(SWT) = \frac{ticks\_not\_in\_idle}{ticks} \cdot (PURR_{START}(HWT) - PURR_{END}(HWT)).$$

The utilization is relative to the capacity provided. Of course, if the capacity is less due to throttling or DVFS, the utilization increases, but that matches both intuition and the semantics of the previous implementations.

In order to accurately charge for the work being performed by a microprocessor, a charge is determined, which takes into account of the work processed as well as the level of the microprocessor performance. Accurate accounting schemes use the SPURR since not all clock cycles and all timebase ticks always have the same capacity to get work done, and, thus, users should not be charged the same for them. The accounting charge ACC(SWT) for a software thread SWT over a dispatch interval, with SWT assigned to an SMT hardware thread HWT, is defined as follows, where $SPURR_{IDLE}$(HWT) is the content of SPURR for HWT when HWT is idle:

$$ACC(SWT)=(SPURR_{END}(HWT)-SPURR_{START}(HWT))-SPURR_{IDLE}(HWT)$$

System software such as PHYP and operating systems may further adjust the accounting charge to eliminate the time that is spent in interrupt handlers.

The following equation is an example calculation for such an overall accounting charge $(t), where $f_{nom}$ denotes the nominal microprocessor clock frequency:

$$\$(t) = \sum_0^{n(t)} disp\_rate(i) \cdot ratio_f(i) = \frac{1}{f_{nom}} \cdot \sum_{i=0}^{n(t)} disp\_rate(i) \cdot f(i).$$

The microprocessor instruction dispatch rate disp_rate(i) in the equation depends on the current workload. The current microprocessor clock frequency f(i) depends on the activity of the microprocessor chip, which can include two or more processor cores, and its effect on microprocessor power consumption and heat dissipation. This equation can be used as a cost function.

Figure 1:
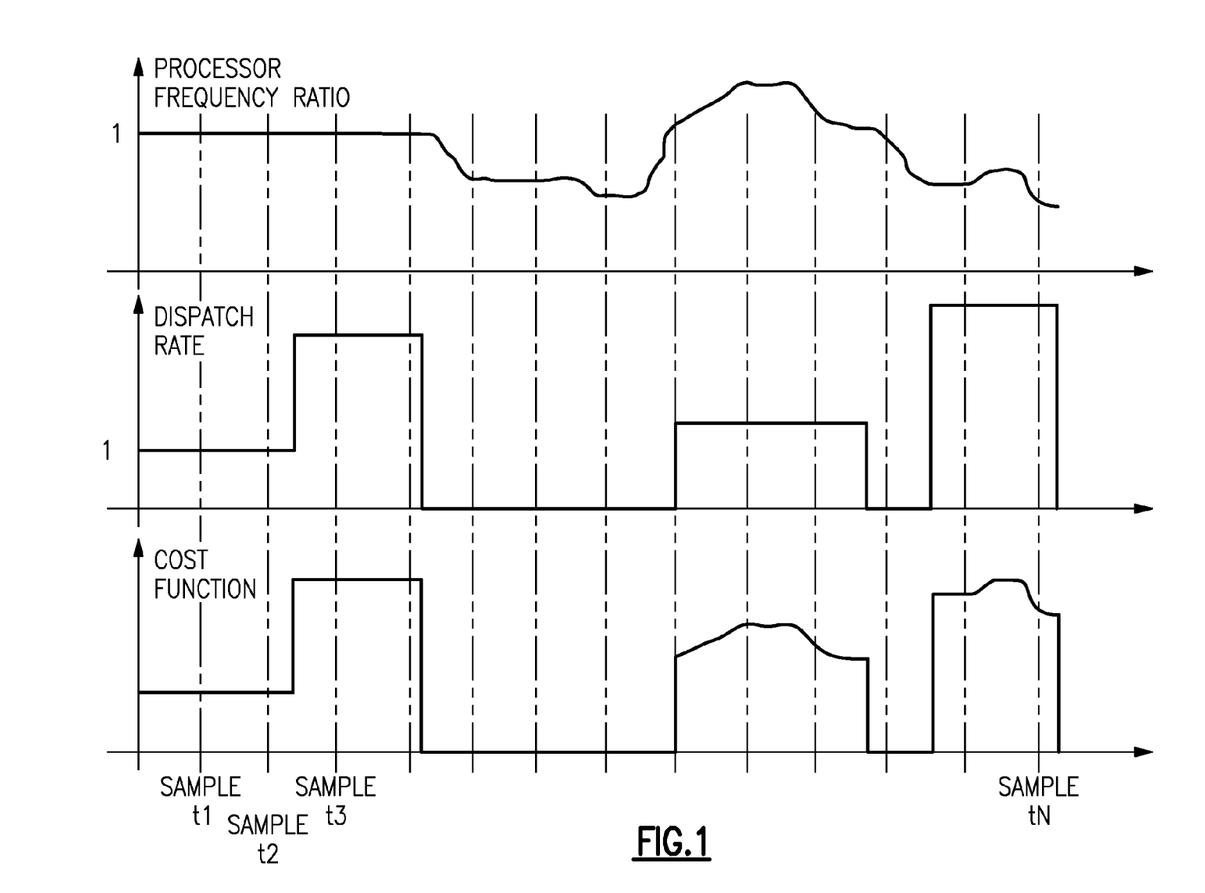
FIG. 1 is a function graph illustrating microprocessor resource accounting in relation to other microprocessor characteristics.

In order to accurately charge the customer at each change, the multiplicands in the above equation for the accounting charge $(t) need to be sampled. FIG. 1 illustrates such samples at times t1, . . . , tN. The dispatch rate is changing each clock cycle requiring a constant update. Microprocessor clock frequency changes are performed over a period such as dozens of clock cycles. Therefore, a mechanism to provide real-time samples of the current microprocessor clock frequency (or the ratio of current to nominal microprocessor clock frequency) is needed for determining an accurate customer charge as illustrated by the cost function graph in FIG. 1.

Clock Frequency Determination

A solution for the determination of the microprocessor clock frequency may include using a regular CPU firmware implementation executed by the microprocessor. This firmware implementation would be using at least a subset of the instruction set of the microprocessor. For example, the clock frequency values can be provided by an additional service processor, from which the microprocessor retrieves these values. However, such operations may have a high latency due to the low speed connection path between the microprocessor and its service processor, which speed is significantly lower than typical connection paths within the microprocessor.

In general, the firmware implementation requires a write path for the firmware into the microprocessor. However, this write path may need to provide enough bandwidth in order to allow frequent updates to store the microprocessor clock frequency values. Further, the latency of such write operation must be in an order which does not cause differences between the actual clock frequency and the calculated clock frequency. Therefore, another solution for the determination of the microprocessor clock frequency is desirable.

Figure 2:
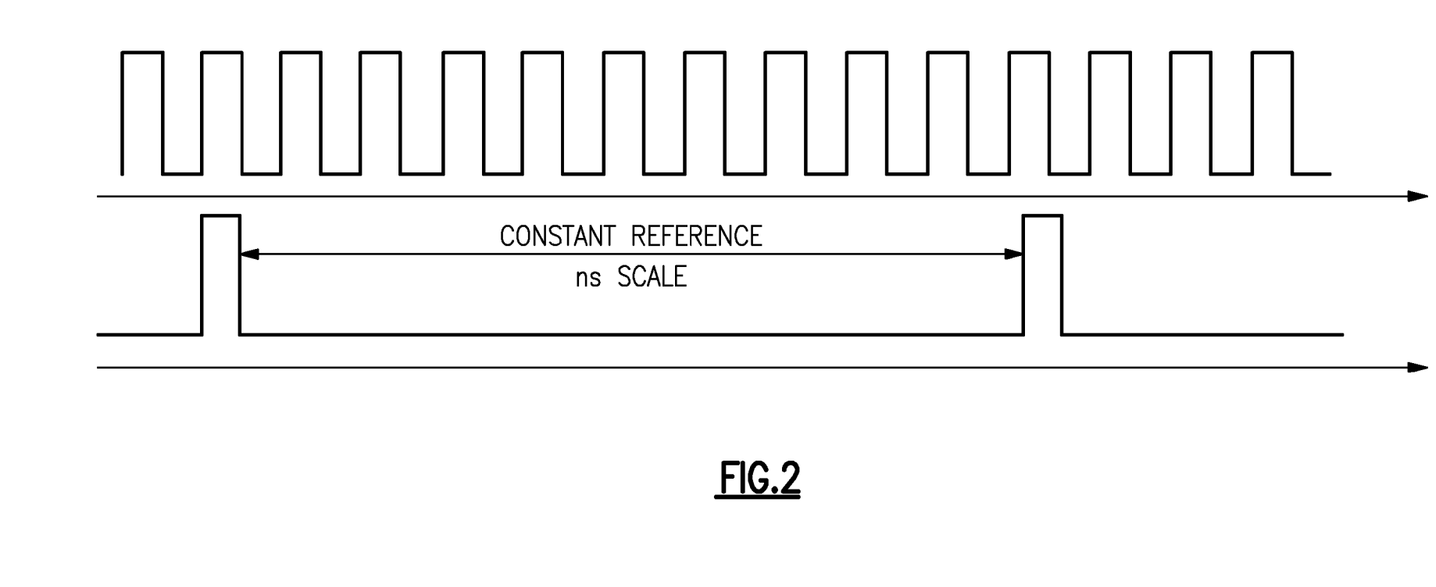
FIG. 2 is a function graph illustrating clock signals.

As discussed above with regards to the timebase ticks, the POWER5 microprocessor implements a timer reference, which counts real and not microprocessor clock cycles. This facility requires a constant time reference, which is not affected by any performance impacting effects due to thermal or power management. However, the granularity of such time reference is typically considerably smaller. While this time reference is in the MHz range, allowing a granularity in a hundred nanoseconds range, current microprocessors are running at clock frequencies in the multiple GHz range, thus having a granularity of the microprocessor clock in the 100 picoseconds range. These differences in the granularities between these clock signals are illustrated in FIG. 2. The number of clock cycles per timer reference interval determines the current microprocessor frequency in respect to the constant time reference.

According to an embodiment of the invention, the information provided by a timer reference signal is coupled with the current microprocessor clock frequency. The number of clock cycles in a reference window determines a clock cycle count n for this reference window as shown in the following equation:

$$n = \frac{T_{time\_reference}}{T_{actual}}.$$

With this value n, an accurate number for the microprocessor clock frequency may be determined by software executed on the microprocessor. This determination takes into account any secondary effects such as process or thermal variations and voltage scaling of the microprocessor. The following equations show that the clock cycle count n is the ratio between the actual microprocessor clock frequency $f_{actual}$ and the clock frequency $f_{time\_reference}$ of the timer reference clock signal:

$$n = \frac{T_{time\_reference}}{T_{actual}} = \frac{f_{actual}}{f_{time\_reference}}.$$

More general, the ratio between two clock cycle counts $n_1$ and $n_2$ is the ratio between the associated microprocessor clock frequencies $f_1$ and $f_2$:

$$\frac{n_1}{n_2} = \frac{\frac{f_1}{f_{time\_reference}}}{\frac{f_2}{f_{time\_reference}}} = \frac{f_1}{f_2}.$$

For resource accounting purposes, the difference between the nominal microprocessor performance, which the customer would generally pay for, to the current performance, which the customer should have actually paid, needs to be determined. An initial base value may be determined and stored as a reference of clock cycle counts $n_0$, which is the base for the calculation of the actual to the nominal performance. This nominal value can be determined by one initial calculation of the clock cycle count, which stores the 2's complement of the value in order to allow an easy dive algorithm for a later determination step.

A suitable update interval in the range of multiple reference windows is selected to guarantee the timely determination of any microprocessor clock frequency change. However, longer update intervals allow a hardware implementation of the determination step as a pipelined operation, which results in smaller hardware overhead. For example, a pipelined divider circuit may be used to generate a ratio of the current clock cycle count to the initially derived clock cycle count as shown in the following equations:

$$ratio_{cycle\_count} = \frac{n_{current}}{n_0} = ratio_{freq} = \frac{f_{current}}{f_0}.$$

This ratio may be used to accurately account for the frequency changes. If the requirements on the cost function are not configured as in the POWER5 processor architecture, the ratio derivation does not need to be performed by the microprocessor hardware. Rather the base value of the clock cycle count may be stored for software, which performs off-line calculations of the actual cost by dividing the real-time sum of products of cycle count and dispatch rate by the cycle count. This allows a simplified hardware implementation for the microprocessor, while still offering the opportunity to take any secondary effects into account and sampling the current processor frequency in a timely manner.

The following example illustrates the microprocessor frequency determination according to an embodiment of the invention. Assume a timer reference clock signal with a frequency of 32 MHz and a 4:1 phase hold. The initial clock cycle count is 32−(32/4)=24 for a nominal microprocessor clock frequency of 3.07 GHz. The new clock cycle count is 20 for a current microprocessor clock frequency of 2.56 GHz. The ratio between the two frequencies and the two clock cycle counts is about 0.83. Assuming further that the minimal value for the microprocessor clock frequency is a fourth of the nominal microprocessor clock frequency (about 0.76 GHz), a minimal update interval of 24/4=6 clock cycles is allowed.

Figure 3:
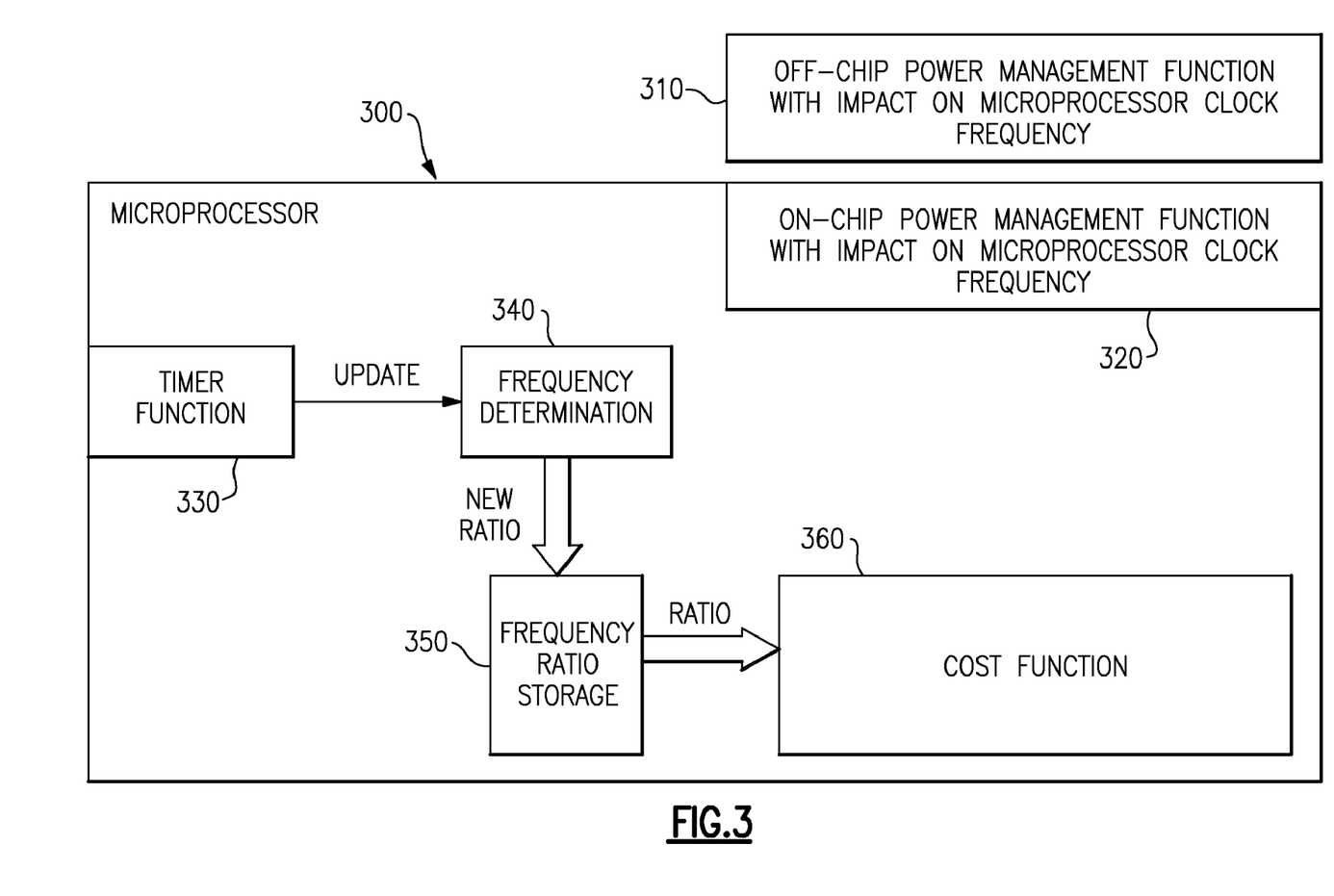
FIG. 3 is a block diagram illustrating a microprocessor in accordance with the present invention.

FIG. 3 illustrates a microprocessor 300 in accordance with the present invention, which is controlled by a power management function. This power management function is either completely performed by an external off-chip apparatus 310 or an on-chip apparatus 320 comprised on the microprocessor 300, or a by a combination of such apparatuses. The apparatus 310 and/or 320 changes the clock frequency of the microprocessor 300 over time, for example based on known DFVS methods. The microprocessor 300 further comprises a timer function 330 similar to the timer functionality of the POWER5 processor architecture as described above.

A frequency determination apparatus 340 uses the timer function 330 for performing a method in accordance with an embodiment of the present invention. A divider functionality can be used as part of the frequency determination apparatus 340 in order to determine the current clock cycle interval length to the initial clock cycle interval length. The latency of such divider functionality should reflect the accuracy needs trade off to the ratio update rate. For the determination of the length of a reference interval (timer update) an increment function can be used as part of frequency determination apparatus 340.

The frequency determination apparatus 340 stores the calculated clock cycle ratio (which is equal to the ratio between the actual microprocessor clock frequency and the nominal microprocessor clock frequency as discussed above) in a frequency ratio storage 350. A simple implementation for such frequency ratio storage would be a SPR, which can be accessed by software executed by the microprocessor 300. This software could then use the clock cycle ratio to calculate a cost function for the resource consumption of the microprocessor 300. It is also possible, that a cost function apparatus 360 does such calculations as part of the microprocessor 300. The result of these calculations can be accessed by SPRs for example. The preferred embodiment of the invention is that the cost function apparatus 360 implements the SPURR for each SMT hardware thread. The frequency determination apparatus 340 uses a control state machine that keeps track of updates to the current reference interval length and triggers the updates to the ratio value in the frequency ratio storage 350 as used by the cost function.

Figure 4:
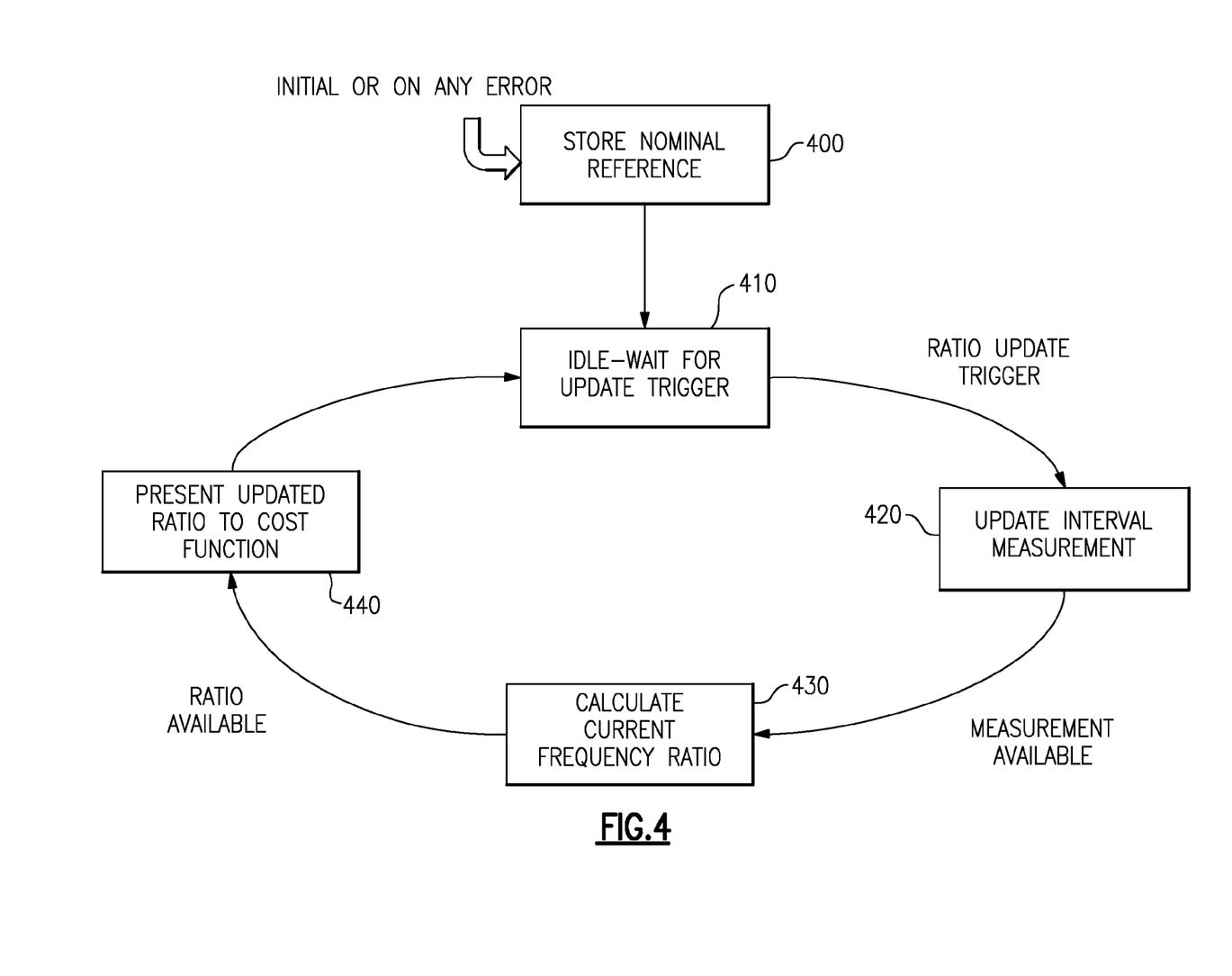
FIG. 4 is a flow diagram illustrating a method in accordance with the present invention.

FIG. 4 provides a more detailed flow diagram for a method in accordance with an embodiment of the present invention, as e.g. performed by the frequency determination apparatus 340. In step 400 the nominal reference value for the clock cycle count will be determined and stored. Step 400 will be performed initially or in case of any error. Then in the subsequent step 410, control logic waits for an update trigger event. Once this event occurs, the control logic will sample current clock cycle count in step 420 and calculate the current microprocessor clock frequency ratio in step 430. The updated microprocessor frequency ratio is then presented to the cost function in step 440. Then in the subsequent step 410, the control logic waits for an update trigger event again unless an error occurs.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Those skilled in the art may recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of a hardware embodiment, a software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary, a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 5:
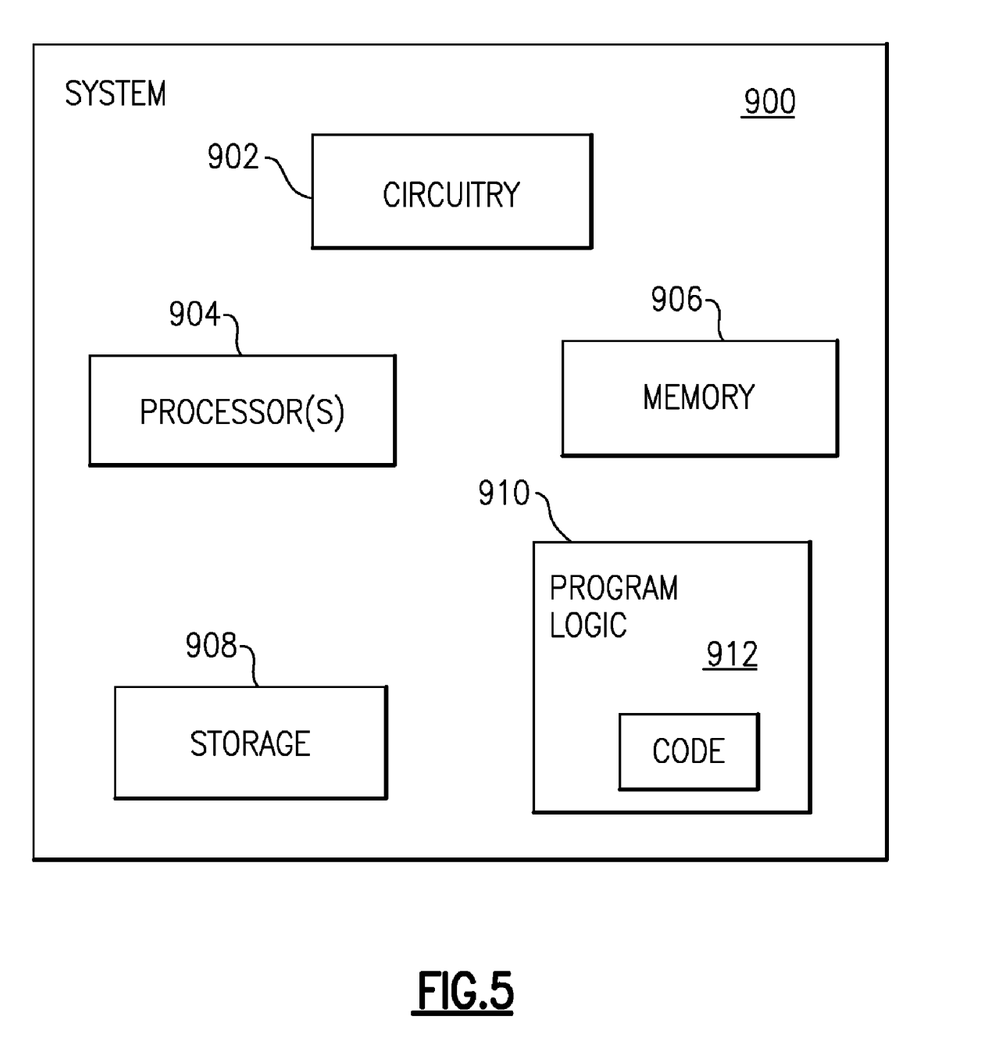
FIG. 5 is a block diagram of a system in which certain embodiments may be implemented.

FIG. 5 illustrates a block diagram of a computer system 900 in which certain embodiments may be implemented. The system 900 may include circuitry 902 that may in certain embodiments include a microprocessor 904. The computer system 900 may also include a memory 906 (e.g., a volatile memory device), and storage 908. The storage 908 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the microprocessor 904 or circuitry 902. In certain embodiments, the program logic 910 including code 912 may be stored in the storage 908. In certain other embodiments, the program logic 910 may be implemented in the circuitry 902. Therefore, while FIG. 5 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in the figures may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in the figures and the description are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

The invention claimed is:

1. A method for determining current clock frequency of a microprocessor, the method comprising:
   determining and storing an initial microprocessor clock cycle count for a period when the current clock frequency of said microprocessor is a nominal clock frequency of said microprocessor;
   periodically sampling microprocessor clock cycle counts for said microprocessor;
   calculating a frequency ratio between an actual clock frequency and the nominal clock frequency of said microprocessor based on a ratio of a sampled microprocessor clock cycle count and said initial microprocessor clock cycle count; and
   providing said frequency ratio for determining said actual clock frequency.

2. The method of claim 1, wherein the periodic sampling is controlled by a constant timer reference signal.

3. The method of claim 1, further comprising a timer for determining clock cycle counts independent of the current microprocessor clock frequency.

4. A computer program product comprising a non-transitory computer usable medium embodying program instructions executable by a computer, said embodied program instructions comprising a computer program for:
   determining and storing an initial microprocessor clock cycle count for a period when the current clock frequency of said microprocessor is a nominal clock frequency of said microprocessor;
   periodically sampling microprocessor clock cycle counts for said microprocessor;
   calculating a frequency ratio between an actual clock frequency and the nominal clock frequency of said microprocessor based on a ratio of a sampled microprocessor clock cycle count and said initial microprocessor clock cycle count; and
   providing said frequency ratio for determining said actual clock frequency.

5. The computer program product of claim 4, further comprising a timer for determining clock cycle counts independent of the current microprocessor clock frequency.

6. A microprocessor configured to perform a method to determine a current clock frequency of a microprocessor, the method comprising:
   determining and storing an initial microprocessor clock cycle count for a period when the current clock frequency of said microprocessor is a nominal clock frequency of said microprocessor;
   periodically sampling microprocessor clock cycle counts for said microprocessor;
   calculating a frequency ratio between an actual clock frequency and the nominal clock frequency of said microprocessor based on a ratio of a sampled microprocessor clock cycle count and said initial microprocessor clock cycle count; and
   providing said frequency ratio for determining said actual clock frequency.

7. The microprocessor of claim 6, further comprising a timer for determining clock cycle counts independent from the current microprocessor clock frequency.

8. The microprocessor of claim 7, wherein said timer comprises an external timer reference signal.

9. The microprocessor of claim 6, wherein said frequency ratio is stored in a special purpose register.

10. The microprocessor of claim 9, further comprising a cost function apparatus to retrieve said frequency ratio from said special purpose register for calculating the microprocessor resource consumption.

11. The microprocessor of claim 6, further comprising a divider to calculate said frequency ratio.

12. The microprocessor of claim 6, further comprising a state machine to control sampling of clock cycle counts.

13. The microprocessor of claim 6, further comprising a power management function for changing the microprocessor clock frequency to reduce power consumption.

14. The microprocessor of claim 13, wherein said power management function comprises an external apparatus or an internal apparatus or a combination thereof.

15. The microprocessor of claim 6, wherein multiple threads of execution are performed concurrently.

16. The microprocessor of claim 15, wherein a thread of execution processes a sequence of instructions of the microprocessor.

* * * * *